United States Patent
Patil et al.

(10) Patent No.: US 9,883,513 B2
(45) Date of Patent: Jan. 30, 2018

(54) SCHEDULING OF DEVICE-TO-DEVICE SCHEDULING ASSIGNMENT FOR MODE1

(71) Applicant: QUALCOMM Incorporated, San Diego, CA (US)

(72) Inventors: Shailesh Patil, North Wales, PA (US); Saurabha Rangrao Tavildar, Jersey City, NJ (US); Sudhir Kumar Baghel, Bridgewater, NJ (US); Kapil Gulati, Long Branch, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 14/607,383

(22) Filed: Jan. 28, 2015

(65) Prior Publication Data

US 2015/0271807 A1 Sep. 24, 2015

Related U.S. Application Data

(60) Provisional application No. 61/955,643, filed on Mar. 19, 2014.

(51) Int. Cl.
*H04W 4/00* (2009.01)
*H04W 72/04* (2009.01)
*H04W 52/38* (2009.01)
*H04W 72/12* (2009.01)
*H04W 76/02* (2009.01)
(Continued)

(52) U.S. Cl.
CPC ....... *H04W 72/048* (2013.01); *H04W 52/383* (2013.01); *H04W 72/042* (2013.01); *H04W 72/1215* (2013.01); *H04W 72/1294* (2013.01); *H04W 76/023* (2013.01); *H04W 72/14* (2013.01); *H04W 88/06* (2013.01)

(58) Field of Classification Search
CPC ............. H04W 72/048; H04W 76/023; H04W 72/1215; H04W 72/1294; H04W 52/383; H04W 72/042; H04W 88/06
USPC .................................. 455/426.1, 450, 452.2
See application file for complete search history.

(56) References Cited

U.S. PATENT DOCUMENTS

| 8,792,459 B2 * | 7/2014 | Patil ................. H04W 72/1257 370/329 |
| 9,295,044 B2 * | 3/2016 | Novak | |
| 9,313,607 B2 * | 4/2016 | Dimou ................. H04W 4/005 |

(Continued)

FOREIGN PATENT DOCUMENTS

WO WO-2013086362 A1 6/2013

OTHER PUBLICATIONS

IPEA/EPO, Second Written Opinion of the International Preliminary Examining Authority, Int'l App. No. PCT/US2015/013526, dated Feb. 11, 2016, European Patent Office, Rijswijk, NL, 5 pgs.
(Continued)

*Primary Examiner* — Marceau Milord
(74) *Attorney, Agent, or Firm* — Holland & Hart LLP

(57) ABSTRACT

Methods, systems, and devices are described for transmitting or receiving at least one grant to a device. The at least one grant may identify one or more scheduling assignment (SA) resources on which an SA is to be transmitted by the device for device-to-device (D2D) communications. The at least one grant may also identify one or more data resources on which data is to be transmitted by the device for D2D communications.

68 Claims, 14 Drawing Sheets

(51) Int. Cl.
*H04W 88/06* (2009.01)
*H04W 72/14* (2009.01)

(56) References Cited

U.S. PATENT DOCUMENTS

| | | | | |
|---|---|---|---|---|
| 2010/0120372 A1* | 5/2010 | Li | H04L 5/0007 | 455/68 |
| 2010/0169498 A1* | 7/2010 | Palanki | H04W 16/14 | 709/228 |
| 2010/0189046 A1* | 7/2010 | Baker | H04L 5/0007 | 370/329 |
| 2010/0189048 A1* | 7/2010 | Baker | H04L 5/0037 | 370/329 |
| 2012/0021748 A1* | 1/2012 | Ostrup | H04W 36/0061 | 455/437 |
| 2012/0093098 A1* | 4/2012 | Charbit | H04W 72/04 | 370/329 |
| 2013/0150108 A1* | 6/2013 | Yang | H04W 52/0216 | 455/509 |
| 2013/0322413 A1* | 12/2013 | Pelletier | H04W 72/1289 | 370/336 |
| 2014/0003319 A1* | 1/2014 | Etemad | H04W 28/08 | 370/312 |
| 2014/0086165 A1* | 3/2014 | Agiwal | H04L 5/0064 | 370/329 |
| 2014/0098719 A1* | 4/2014 | Kim | H04W 4/008 | 370/280 |
| 2014/0177449 A1* | 6/2014 | Novak | H04W 4/008 | 370/241 |
| 2014/0177540 A1* | 6/2014 | Novak | H04W 72/042 | 370/329 |
| 2014/0241262 A1* | 8/2014 | Novak | H04W 72/042 | 370/329 |
| 2014/0242963 A1* | 8/2014 | Novlan | H04W 48/16 | 455/418 |
| 2014/0301289 A1* | 10/2014 | Johnsson | H04W 76/021 | 370/329 |
| 2015/0004901 A1* | 1/2015 | Agiwal | H04W 76/021 | 455/39 |
| 2015/0011230 A1* | 1/2015 | Noh | H04W 72/12 | 455/450 |
| 2015/0078275 A1* | 3/2015 | Kim | H04W 72/042 | 370/329 |
| 2015/0195823 A1* | 7/2015 | Seo | H04W 72/0406 | 370/329 |
| 2015/0271720 A1* | 9/2015 | Yamada | H04W 76/023 | 370/331 |
| 2015/0271846 A1* | 9/2015 | Kowalski | H04W 72/14 | 370/329 |
| 2015/0296490 A1* | 10/2015 | Yi | H04L 1/1812 | 370/329 |
| 2015/0364677 A1* | 12/2015 | Deak | B82Y 25/00 | 257/421 |
| 2016/0007372 A1* | 1/2016 | Fujishiro | H04W 8/005 | 370/329 |
| 2016/0095131 A1* | 3/2016 | Seo | H04W 72/085 | 370/329 |
| 2016/0183276 A1* | 6/2016 | Marinier | H04W 72/02 | 370/329 |
| 2016/0269887 A1* | 9/2016 | Kim | H04W 72/02 | |
| 2016/0294519 A1* | 10/2016 | Kim | H04L 5/00 | |
| 2016/0345312 A1* | 11/2016 | Kim | H04W 76/023 | |
| 2016/0353478 A1* | 12/2016 | Kim | H04W 72/12 | |
| 2017/0099174 A1* | 4/2017 | Kim | H04L 27/2613 | |

OTHER PUBLICATIONS

Ericsson, "Configuration of Resource Pools for Various Coverage Scenarios," 3GPP TSG-RAN WG2 #85, Prague, Czech Republic, Feb. 10-14, 2014, R2-140622, pp. 1-4, URL: http://www.3gpp.org/ftp/tsg_ran/WG2_RL2/TSGR2_85/docs/, 3rd Generation Partnership Project.

Ericsson, "Resource Allocation for D2D Transmitters in Coverage," 3GPP TSG-RAN WG2 #85, Prague, Czech Republic, Feb. 10-14, 2014, R2-140625, pp. 1-5, URL: http://www.3gpp.org/ftp/tsg_ran/WG2_RL2/TSGR2_85/docs/, 3rd Generation Partnership Project.

Ericsson, "Overview of D2D Functions Needing Standardization," 3GPP TSG-RAN WG2 #85, Prague, Czech Republic, Feb. 10-14, 2014, R2-140797, pp. 1-7, URL: http://www.3gpp.org/ftp/tsg_ran/WG2_RL2/TSGR2_85/docs/, 3rd Generation Partnership Project.

ETRI, "Overall Procedure of Fully Scheduled Allocation," 3GPP TSG-RAN WG2 #83bis, Ljubljana, Slovenia, Oct. 7-11, 2013, R2-133270, pp. 1-6, URL: http://www.3gpp.org/ftp/tsg_ran/wg2_rl2/TSGR2_83bis/Docs/, 3rd Generation Partnership Project.

ISA/EPO, International Search Report and Written Opinion of the International Preliminary Examining Authority, Int'l. App. No. PCT/US2015/013526, dated Apr. 30, 2015, European Patent Office, Rijswijk, NL, 12 pgs.

* cited by examiner

905 — Transmit at least one grant to a device, the at least one grant identifying one or more scheduling assignment (SA) resources on which an SA is to be transmitted by the device for device-to-device (D2D) communications, and the at least one grant identifying one or more data resources on which data is to be transmitted by the device for D2D communications

SCHEDULING OF DEVICE-TO-DEVICE SCHEDULING ASSIGNMENT FOR MODE1

CROSS REFERENCES

The present application for patent claims priority to U.S. Provisional Patent Application No. 61/955,643 by Patil et al., entitled "Scheduling of Device-To-Device Scheduling Assignment for Mode1," filed Mar. 19, 2014, and assigned to the assignee hereof.

BACKGROUND

1. Field of the Disclosure

The present disclosure, for example, relates to wireless communication systems, and more particularly to techniques for scheduling of device-to-device scheduling assignment in systems which may utilize direct wireless communications between devices.

2. Description of the Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices or other user equipment (UE) devices. Base stations may communicate with UEs on downstream and upstream links. Each base station has a coverage range, which may be referred to as the coverage area of the cell. Device-to-device (D2D) communications include direct wireless communications between UEs either within or beyond the coverage area of a base station. D2D communications may be facilitated by scheduling transmissions from a base station if the devices are within a coverage area. In some cases, D2D communications are utilized by public safety officers such as police, fire and rescue teams, for example.

When a UE is in a certain communications mode, it may be required to receive grants from a base station before transmitting data via D2D communications. For example, a UE may be required to receive grants from the base station when the UE is in mode 1. These grants may indicate which resources the UE should use for various transmissions in D2D communications.

SUMMARY

The described features generally relate to one or more improved systems, methods, and/or apparatuses for transmitting or receiving grants for device-to-device (D2D) communications. According to various examples, at least one grant may be transmitted to a device. The at least one grant may identify one or more scheduling assignment (SA) resources on which an SA is to be transmitted by the device for D2D communications. The at least one grant may also identify one or more data resources on which data is to be transmitted by the device for D2D communications. In certain examples, the at least one grant may be scrambled according to a scrambling type. The scrambling type may indicate that the one or more SA resources and the one or more data resources are allocated for D2D communications. The device may receive the at least one grant, descramble the at least one grant according to the scrambling type, which indicates that the resources of the at least one grant are for D2D communications. The device may then use the resources for D2D communications.

A method is described for wireless communications. In one configuration, the method includes transmitting at least one grant to a device. In examples, the at least one grant may identify one or more SA resources on which an SA is to be transmitted by the D2D communications. Additionally, the at least one grant may identify one or more data resources on which data is to be transmitted by the device for D2D communications.

In some examples, the method may also include scrambling the at least one grant according to a scrambling type. In such examples, the scrambling type may indicate that the one or more SA resources and the one or more data resources are allocated for D2D communications. In some examples, the scrambling type may include a D2D radio network temporary identifier (RNTI). Further, the scrambling type may include a semi-persistent scheduling (SPS) D2D RNTI. In some examples, the scrambling may include scrambling a cyclic redundancy check (CRC) of the at least one grant.

In some examples, the at least one grant may be a single grant. In such examples, the single grant may identify the one or more SA resources for the device to use to transmit the SA. In some examples, the one or more data resources may be identified by the device based at least in part on the one or more SA resources.

In other examples, the at least one grant may include a first grant and a second grant. In such examples, the first grant may identify the one or more SA resources, and the second grant may identify the one or more data resources. In some examples, the transmitting may include transmitting the first grant identifying the one or more SA resources at a first time period, and transmitting the second grant identifying the one or more data resources at a second time period. The second time period may be different from the first time period, and may be determined based at least in part on the first time period. In some examples, the method may also include setting an indicator to differentiate between the transmission of the first grant identifying the one or more SA resources and the transmission of the second grant identifying the one or more data resources.

In some examples, the at least one grant may include or identify an SA transmit power, an SA modulation and coding scheme (MCS), an SA redundancy version, or a combination thereof. Alternatively or additionally, the at least one grant may include or identify a data transmit power, a data MCS, a data redundancy version, or a combination thereof. Alternatively or additionally, the at least one grant may include or identify a target identification (ID) for a destination device of the SA, wherein the target ID is a groupcast ID, a broadcast ID, or a unicast ID. In such examples, the target ID may be compressed or index-based. Alternatively or additionally, the at least one grant may include or identify a time hopping pattern of the one or more data resources, a frequency hopping pattern of the one or more data resources, or a combination thereof. In some examples, the at least one grant may include one or more transmit power control (TPC) bits. The TPC bits may indicate an SA transmit power or a data transmit power.

In some examples, the at least one grant may be transmitted via a physical downlink control channel (PDCCH) or a physical downlink shared channel (PDSCH), or a combination thereof, in Long Term Evolution (LTE). In such examples, the at least one grant may be included in downlink control information (DCI). In some examples, the PDSCH may include information regarding both the one or more SA resources and the one or more data resources for D2D communications. In some examples, the method may also include scrambling the at least one grant transmitted via the PDCCH with a D2D RNTI to indicate that the at least one grant is related to D2D communications. Alternatively or additionally, the method may include scrambling the at least one grant transmitted via the PDCCH with a target ID.

An apparatus is described for wireless communications. In one configuration, the apparatus may include means for transmitting at least one grant to a device. The at least one grant may identify one or more SA resources on which an SA is to be transmitted by the device for D2D communications. The at least one grant may also identify one or more data resources on which data is to be transmitted by the device for D2D communications.

A device is described for use in a wireless communications system. In one configuration, the device may include a processor and memory in electronic communication with the processor. Instructions may be stored in the memory. The instructions may be executable by the processor to transmit at least one grant to a device. The at least one grant may identify one or more SA resources on which an SA is to be transmitted by the device for D2D communications. The at least one grant may also identify one or more data resources on which data is to be transmitted by the device for D2D communications.

A computer program product also is described. The computer program product may be a tangible computer-readable storage device having computer-readable program code stored thereon. The computer-readable program code may include computer-readable program code configured to cause at least one processor to transmit at least one grant to a device. The at least one grant may identify one or more SA resources on which an SA is to be transmitted by the device for D2D communications. The at least one grant may also identify one or more data resources on which data is to be transmitted by the device for D2D communications.

Another method is described for wireless communications. In one configuration, the method includes receiving at least one grant from a base station. In examples, the at least one grant may identify one or more SA resources on which an SA is to be transmitted by the device for D2D communications. The at least one grant may also identify one or more data resources on which data is to be transmitted by the device for D2D communications.

In some examples, the at least one grant may be scrambled. In such case, the method may include descrambling the at least one grant according to a descrambling technique. In such examples, the method may also include determining that the one or more SA resources and the one or more data resources are allocated for D2D communications based at least in part on the descrambling technique. Alternatively or additionally, the method may include determining that the one or more SA resources and the one or more data resources are semi-persistently allocated for D2D communications based at least in part on the descrambling technique. Alternatively or additionally, the descrambling may include descrambling a CRC of the at least one grant.

In some examples, the at least one grant may be a single grant. In such examples, the method may include identifying, from the single grant, the one or more SA resources to use to transmit the SA. The method may also include identifying the one or more data resources to use to transmit the data, based at least in part on the one or more SA resources.

In other examples, the at least one grant may include a first grant and a second grant. The first grant may identify the one or more SA resources, and the second grant may identify the one or more data resources. In such examples, the receiving may include receiving the first grant identifying the one or more SA resources at a first time period, and receiving the second grant identifying the one or more data resources at a second time period. The second time period may be different from the first time period, and may be determined based at least in part on the first time period. In some examples, the method may include analyzing an indicator to differentiate between the transmission of the first grant identifying the one or more SA resources and the transmission of the second grant identifying the one or more data resources.

In some examples, the at least one grant may be received via a PDCCH or a PDSCH, or a combination thereof, in LTE. In such examples, the PDSCH may include information regarding both the one or more SA resources and the one or more data resources for D2D communications. In some examples, the method may include descrambling the at least one grant transmitted via the PDCCH with a D2D RNTI to indicate that the at least one grant is related to D2D communications. Alternatively or additionally, the method may include descrambling the at least one grant transmitted via the PDCCH with a target ID. In some examples, the at least one grant may be included in DCI.

Another apparatus is described for wireless communications. In one configuration, the apparatus may include means for receiving at least one grant from a base station. The at least one grant may identify one or more SA resources on which an SA is to be transmitted by a device for D2D communications, and may identify one or more data resources on which data is to be transmitted by the device for D2D communications.

Another device is described for wireless communications. In one configuration, the device may include a processor and memory in electronic communication with the processor. Instructions may be stored in the memory. The instructions may be executable by the processor to receive at least one grant from a base station. The at least one grant may identify one or more SA resources on which an SA is to be transmitted by the device for D2D communications, and may identify one or more data resources on which data is to be transmitted by the device for D2D communications.

Another computer program product is described. In one configuration, the computer program product may be a tangible computer-readable storage device having computer-readable program code stored thereon. The computer-readable program code may include computer-readable program code configured to cause at least one processor to receive at least one grant from a base station. The at least one grant may identify one or more SA resources on which an SA is to be transmitted by the device for D2D communications, and may identify one or more data resources on which data is to be transmitted by the device for D2D communications.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 9 shows a flowchart illustrating a method for wireless communications, in accordance with various aspects of the present disclosure;

DETAILED DESCRIPTION

Figure 1:
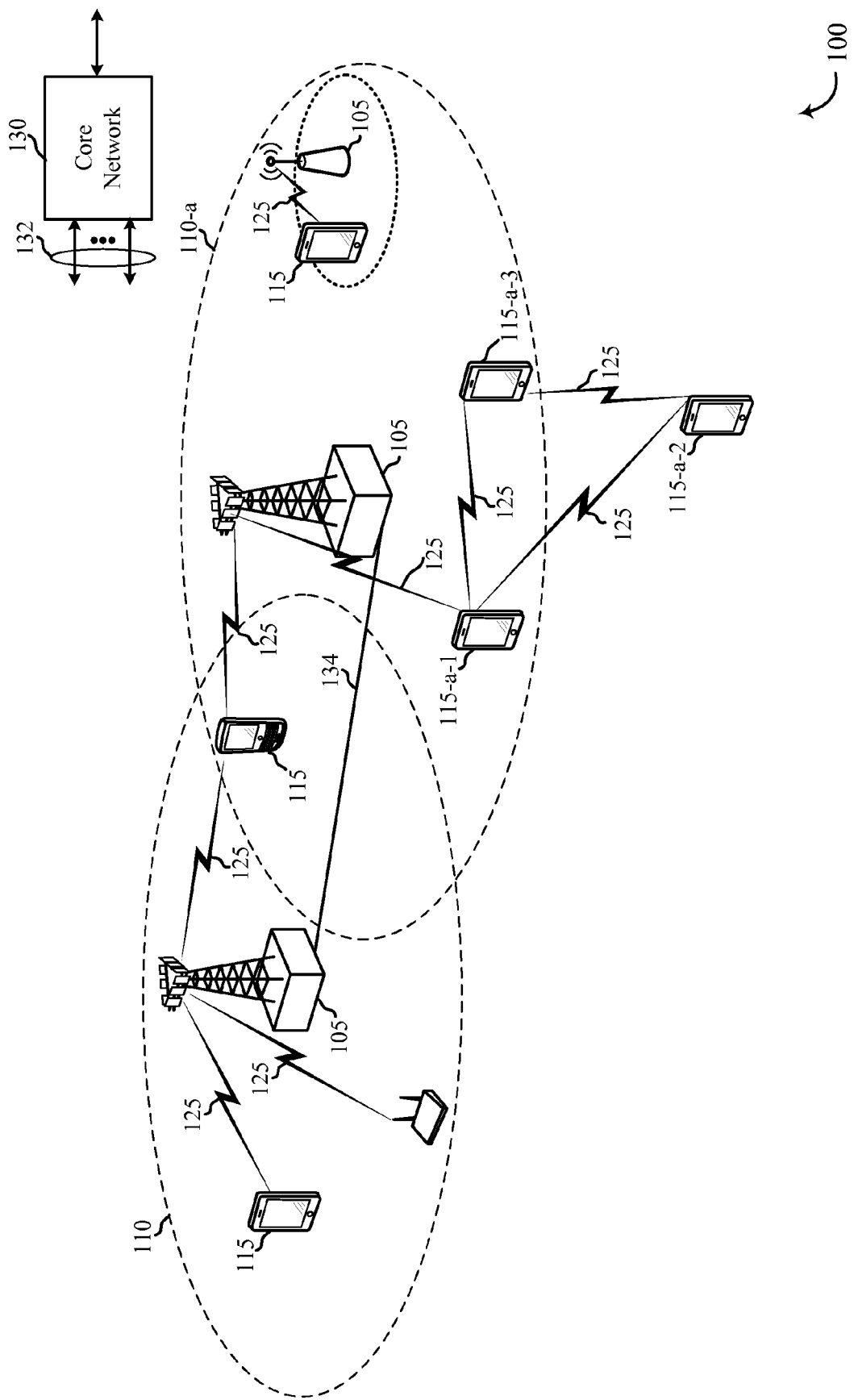
FIG. 1 shows a block diagram of a wireless communications system, in accordance with various aspects of the present disclosure.

Features generally relating to one or more improved systems, methods, and/or apparatuses for transmitting or receiving grants for device-to-device (D2D) communications are described. One or more grants transmitted from a base station to a device may identify one or more scheduling assignment (SA) resources on which an SA is to be transmitted by the device for D2D communications. The one or more grants may also identify one or more data resources on which data is to be transmitted by the device for D2D communications.

In certain examples, the SA resource(s) and the data resource(s) may be identified in a single grant. The data resource(s) may be identified explicitly, or implicitly based at least in part on the SA resource(s). In other examples, the SA resource(s) may be identified in a first grant and the data resource(s) may be identified in a second grant. In such a case, the first grant may be transmitted at a first time period, and the second grant may be transmitted at a second time period, different from the first time period and based at least in part on the first time period. Alternatively, in some examples, an indicator may be used to allow the device to differentiate between the transmission of the first grant and the transmission of the second grant. In addition, the grants may be scrambled to allow the device to determine whether the grant is for resources relating to D2D communications or whether the grant is for resources relating to wide area network (WAN) communications.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

FIG. 1 shows a block diagram of a wireless communications system 100, in accordance with various aspects of the present disclosure. The wireless communications system 100 includes base stations 105, communication devices, also known as a user equipment (UE) 115, and a core network 130. The base stations 105 may communicate with the UEs 115 under the control of a base station controller (not shown), which may be part of the core network 130 or the base stations 105 in various examples. Base stations 105 may communicate control information and/or user data with the core network 130 through backhaul links 132. In examples, the base stations 105 may communicate, either directly or indirectly, with each other over backhaul links 134, which may be wired or wireless communication links. The wireless communications system 100 may support operation on multiple carriers (waveform signals of different frequencies). Wireless communication links 125 may be modulated according to various radio technologies. Each modulated signal may carry control information (e.g., reference signals, control channels, etc.), overhead information, data, etc. Wireless communication links 125 may also be established between UEs 115 in a configuration known as D2D communication.

The base stations 105 may wirelessly communicate with the UEs 115 via one or more base station antennas. Each of the base station 105 sites may provide communication coverage for a respective geographic area 110. In some examples, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area. The wireless communications system 100 may include base stations 105 of different types (e.g., macro, micro, and/or pico base stations). There may be overlapping coverage areas for different technologies.

The wireless communications system 100 may be a Heterogeneous LTE/LTE-A network in which different types of base stations provide coverage for various geographical regions. For example, each base station 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell.

The core network 130 may communicate with the base stations 105 via a backhaul 132 (e.g., S1, etc.). The base stations 105 may also communicate with one another, e.g., directly or indirectly via backhaul links 134 (e.g., X2, etc.) and/or via backhaul links 132 (e.g., through core network 130). The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The UEs 115 are dispersed throughout the wireless communications system 100, and each UE may be stationary or mobile. A UE 115 may communicate with other UEs 115 using D2D communications. One or more of a group of UEs (for example, a first UE 115-a-a-1) utilizing D2D communications may be within a coverage area 110-a of a cell. Other UEs (for example, a second UE 115-a-2 and a third UE 115-a-3) in such a group may be outside the coverage area 110-a of the cell, or otherwise unable to receive transmissions from a base station 105. Groups of UEs 115-a communicating via D2D communications may utilize a one-to-many (1:M) system in which each UE 115-a transmits to every other UE 115-a in the group. In some cases, a base station 105 facilitates the scheduling of resources for D2D communications. In other cases, D2D communications are carried out independent of a base station 105. In some cases, UEs 115-a engaged in D2D communications may be located relatively closely. In other circumstances, the UEs 115-a may communicate with each other over long distances. As mentioned above, in some examples a base station 105 may transmit one or more grants to the UE 115-a-1 that indicate resources for the UE 115-a-1 to use for its D2D communications. The base station 105 may scramble the grants in order to enable the UE to differentiate the grants relating to D2D communications from the grants associated with WAN communications.

A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a smart phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The wireless communication links 125 shown in wireless communications system 100 may include uplink (UL) transmissions from a UE 115 to a base station 105, and/or downlink (DL) transmissions, from a base station 105 to a UE 115 over DL carriers. They may also represent D2D communication links. The downlink transmissions may also be called forward link transmissions while the uplink transmissions may also be called reverse link transmissions.

Figure 2:
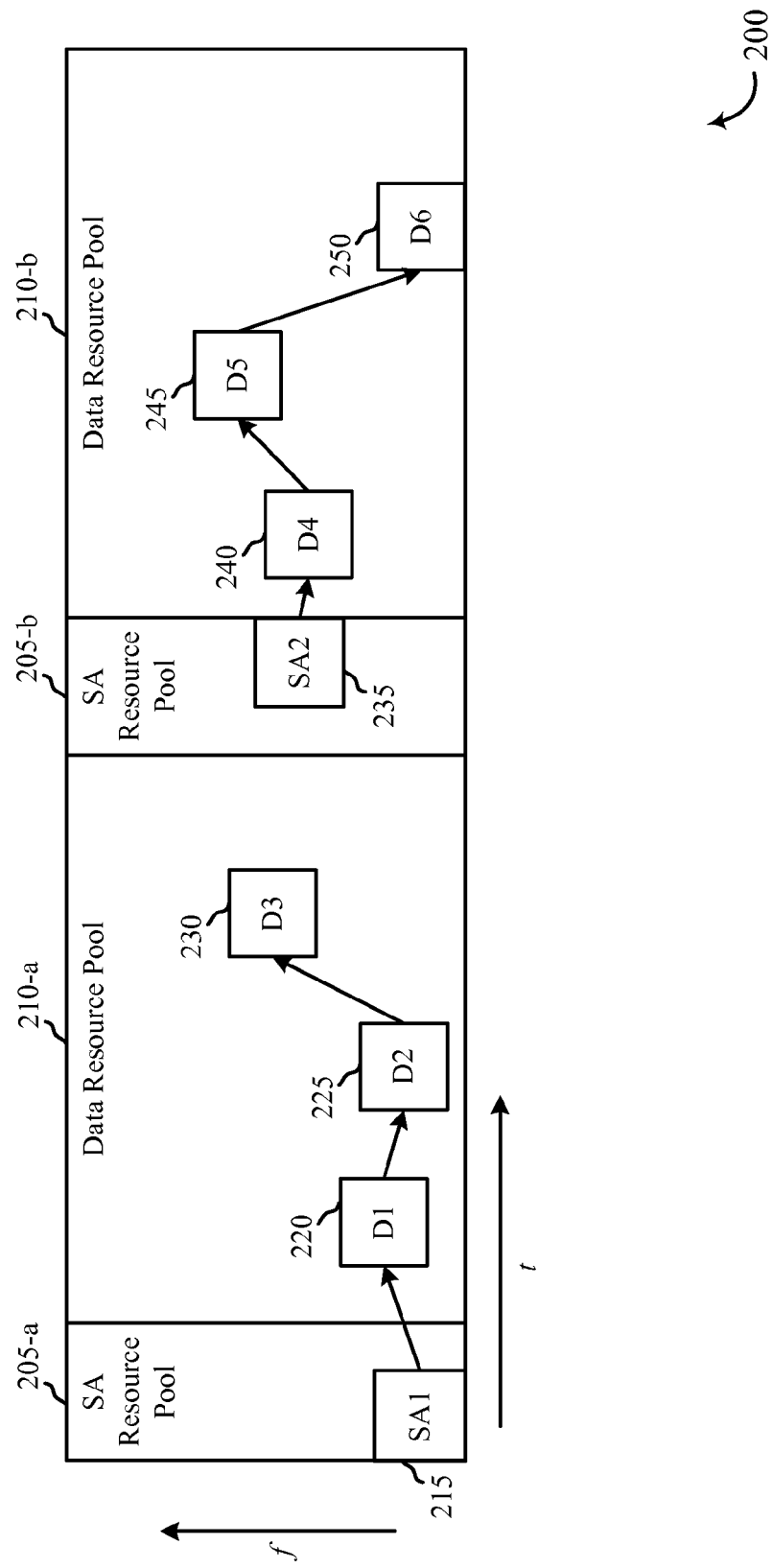
FIG. 2 shows a block diagram of scheduling assignment (SA) and data resources for transmissions of SAs and data, in accordance with various aspects of the present disclosure.

FIG. 2 shows a block diagram illustrating an example 200 of SA resource pools and data resource pools for transmissions of SAs and data, in accordance with various aspects of the present disclosure. Specifically, FIG. 2 illustrates a first SA resource pool 205-a and a first data resource pool 210-a, and a second SA resource pool 205-b and a second data resource pool 210-b. The resource pools 205 and 210 may be used to transmit SAs and data between UEs, such as UEs 115 in FIG. 1, in D2D communications, for example. In some examples, a transmitting UE may transmit a first SA to one or more receiving UEs using resources SA1 215 from within SA resource pool 205-a. The first SA may indicate resources (e.g., different time and/or frequency resources) for subsequent transmissions of data to the one or more receiving UEs or devices. In the example of FIG. 2, the first SA may indicate resources D1 220, D2 225, and D3 230 from within data resource pool 210-a that may be used to transmit data to a receiving UE. The content of the first SA may indicate one or more items of information related to data transmissions, as will be described in more detail below. According to certain examples, the first SA may be retransmitted one or more times using other resources within resources SA1 215. The retransmissions of the first SA may be performed according to a predetermined retransmission pattern, such as retransmissions at certain times and/or frequencies.

Following the data resource pool 210-*a*, in this example, is a second SA resource pool 205-*b*, that may be used to transmit a second SA using resources SA2 235. Similarly as with the first SA, the second SA may be retransmitted one or more times using other resources of SA2 235, and may indicate resources D4 240, D5 245, and D6 250 from within data resource pool 210-*b* that may be used to transmit data to a receiving UE. The D2D transmissions from a transmitting UE may be transmitted as broadcast transmissions to one or more receiving UEs. According to some examples, a receiving UE may monitor the SA resource pool 205-*a* and receive the first SA. If the first SA indicates that the receiving UE is to receive data in a subsequent data transmission, the receiving UE may monitor the data resource pool 210-*a* only during time(s) indicated by the first SA, and may thus save power by only monitoring data pool resources D1 220, D2 225, and D3 230. Similarly, if a receiving UE determines that the first SA, or any other SA transmitted in the SA resource pool 205-*a*, does not indicate that the receiving UE is scheduled to receive data in data resource pool 210-*a*, the receiving UE may discontinue monitoring D2D transmissions until the second SA resource pool 205-*b*.

Figure 3:
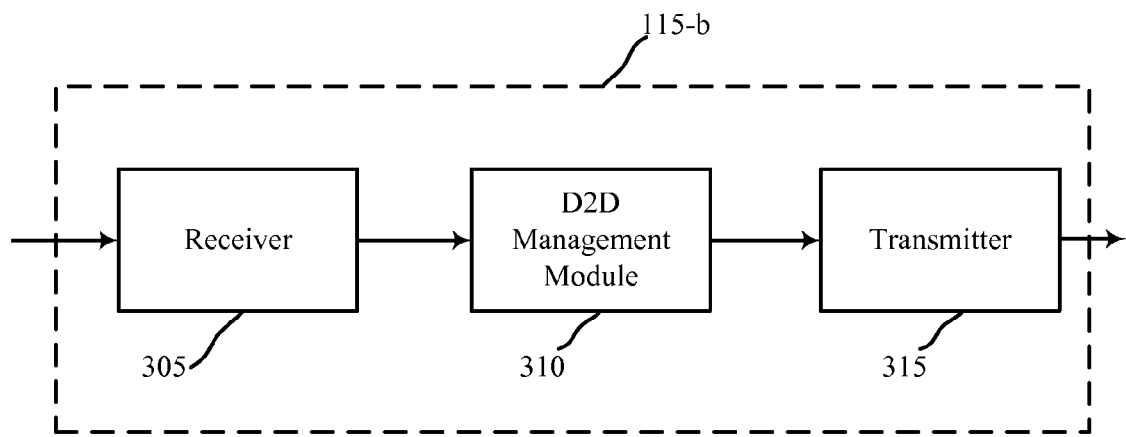
FIG. 3 shows a block diagram of a device for use in device-to-device (D2D) communications, in accordance with various aspects of the present disclosure.

FIG. 3 shows a block diagram 300 of a UE 115-*b* for use in D2D communications, in accordance with various aspects of the present disclosure. The UE 115-*b* may be an example of one or more aspects of a UE 115 described with reference to FIG. 1. The UE 115-*b* may include a receiver 305, a D2D management module 310, and/or a transmitter 315. The UE 115-*b* may also include a processor. Each of these components may be in communication with each other.

The components of the UE 115-*b* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver 305 may receive information such as packets, user data, and/or control information associated with various information channels (e.g., control channels, data channels, etc.). For example, the receiver 305 may receive one or more messages from a base station 105 indicating one or more resources to be used for SA and/or data transmissions. The message(s) may be received via a physical downlink control channel (PDCCH) and/or a physical downlink shared channel (PDSCH). The message(s) from the base station 105 may be received as one or more grants, identifying one or more SA resources on which an SA is to be transmitted by the UE 115-*b* for D2D communications, and identifying one or more data resources on which data is to be transmitted by the UE 115-*b* for D2D communications. In some examples, the grant(s) may be included in downlink control information (DCI), such as DCI format 0. The receiver 305, either alone or in combination with the D2D management module 310, may be means for receiving one or more grants.

The D2D management module 310 may identify or otherwise determine the SA resource(s) and the data resource(s) to use for D2D communications from the grant(s) received from the base station 105. In some examples, the received grant(s) may include or otherwise indicate an SA transmit power, an SA modulation and coding scheme (MCS), and/or an SA redundancy version (RV). Alternatively or additionally, the received grant(s) may include or otherwise indicate a data transmit power, a data MCS, and/or a data RV. Further, the received grant(s) may include or otherwise indicate a target identification (ID) for a destination device of the SA. The target ID may be a groupcast ID, a broadcast ID, or a unicast ID. The target ID may be compressed or may be index-based. The received grant(s) may also include or otherwise indicate a time hopping pattern of the one or more data resources and/or a frequency hopping pattern of the one or more data resources. In some examples, the received grant(s) may include one or more transmit power control (TPC) bits, which may indicate an SA transmit power and/or a data transmit power. The D2D management module 310 may be configured to determine such information from the received grant(s). For example, the size of delta indicated by the TPC bits for the SA transmit power and the data transmit power may be signaled to the UE 115-*b* via a radio resource control (RRC) message, for example, to allow the UE 115-*b* to interpret the TPC bits. The D2D management module 310 may be the means for identifying resources for D2D communications.

The D2D management module 310 further may be configured to carry out D2D communications using the receiver 305 and/or the transmitter 315. The D2D management module 310 may implement the D2D communications in accordance with the information provided by the received grant(s).

The transmitter 315 may transmit one or more signals received from other components of the UE 115-*b*. For example, the transmitter 315 may transmit SA and data transmissions to one or more receiving UEs in D2D transmissions. In some examples, the transmitter 315 may be collocated with the receiver 305 in a transceiver module. The transmitter 315 may include a single antenna, or it may include a plurality of antennas.

Figure 4:
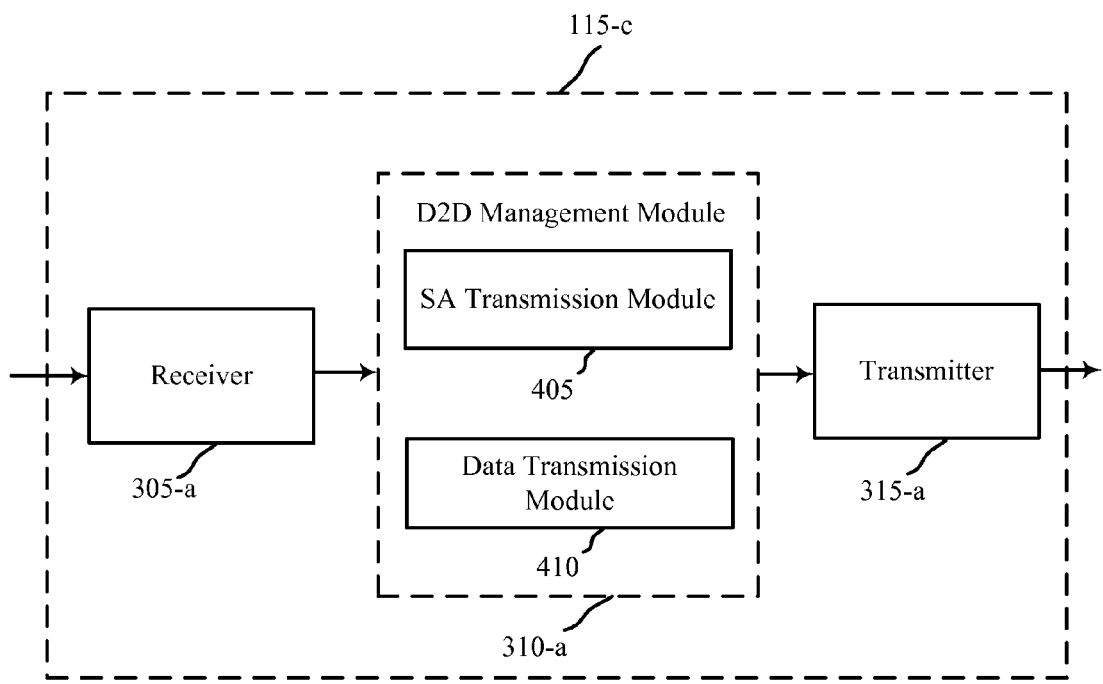
FIG. 4 shows a block diagram of a device for use in D2D communications, in accordance with various aspects of the present disclosure.

FIG. 4 shows a block diagram 400 of a UE 115-*c* for use in D2D communications, in accordance with various aspects of the present disclosure. The UE 115-*c* may be an example of one or more aspects of a UE 115 described with reference to FIGS. 1 and/or 3. The UE 115-*c* may include a receiver 305-*a*, a D2D management module 310-*a*, and/or a transmitter 315-*a*. The UE 115-*c* may also include a processor. Each of these components may be in communication with each other. The D2D management module 310-*a* may also include an SA transmission module 405 and a data transmission module 410.

The components of the UE 115-*c* may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The receiver 305-*a* may receive information which may be passed on to the D2D management module 310-*a*, and to other components of the UE 115-*c* as described above with reference to FIG. 3. The D2D management module 310-*a* may be configured to perform the operations described above with reference to FIG. 3. The transmitter 315-*a* may transmit one or more signals received from other components of the UE 115-*c*. For example, in cases where UE 115-*c* is a D2D transmitting device, it may transmit SA and data transmissions using D2D communications to one or more receiving UEs.

The SA transmission module 405 may be configured to determine SAs and resources from an SA resource pool for use in SA transmissions, in a similar manner as discussed above with respect to FIG. 2, based on the information provided in the grant(s) from a base station 105 (of FIG. 1). The SA transmission module 405 may also be configured to determine SA retransmission patterns, in a similar manner as discussed above with respect to FIG. 2. Similarly, the data transmission module 410 may be configured to determine and use data resources for D2D data transmissions. The SA transmission module 405 and the data transmission module 410, either alone or in combination with the D2D management module 310-*a*, may be means for transmitting an SA via D2D communications and means for transmitting data via D2D communications, respectively.

Figure 5:
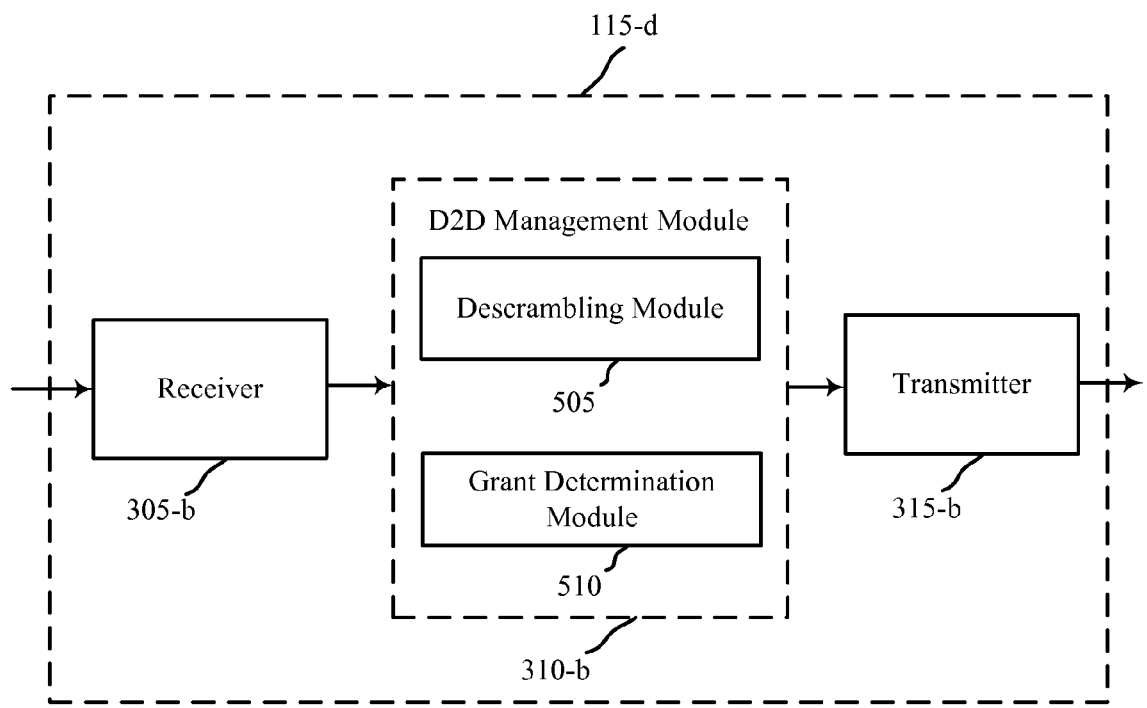
FIG. 5 shows a block diagram of a device for use in D2D communications, in accordance with various aspects of the present disclosure.

FIG. 5 shows a block diagram 500 of a UE 115-*d* for use in D2D communications, in accordance with various aspects of the present disclosure. The UE 115-*d* may be an example of one or more aspects of a UE 115 described with reference to FIGS. 1, 3, and/or 4. The UE 115-*d* may include a receiver 305-*b*, a D2D management module 310-*b*, and/or a transmitter 315-*b*. The UE 115-*d* may also include a processor. Each of these components may be in communication with each other. The D2D management module 310-*b* may also include a descrambling module 505 and a grant determination module 510.

The components of the UE 115-*d* may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The receiver 305-*b*, in this example, may receive information from a base station that indicates an SA resource pool which may be passed on to the D2D management module 310-*b*, and to other components of the UE 115-*d*. The D2D management module 310-*b* may also be configured to perform the operations described above with reference to FIGS. 3 and/or 4. The transmitter 315-*b* may transmit one or more signals received from other components of the UE 115-*d*. For example, in cases where UE 115-*d* is a D2D transmitting device, it may transmit SA and data transmissions using D2D communications to one or more receiving UEs.

The descrambling module 505 may be configured to descramble the grant(s) that may have been scrambled by the base station. The UE 115-*d* may descramble the grant(s) according to a scrambling/descrambling type or technique. The scrambling/descrambling type may indicate that a particular grant (e.g., SA and/or data resources) is allocated for D2D communications. The scrambling/descrambling type may be, for example, a D2D radio network temporary identifier (RNTI). The scrambling/descrambling type may also be a semi-persistent scheduling (SPS) D2D RNTI, to indicate that the resources are semi-persistently allocated for D2D communications (e.g., for multiple or periodic use). The descrambling may include descrambling a cyclic redundancy check (CRC), instead of descrambling the entire grant(s). The descrambling module 505 may have one or more codes for descrambling the grant(s) intended for the UE 115-*d*. The descrambling module 505, either alone or in combination with the D2D management module 310-*b*, may be means for descrambling at least one grant according to a scrambling type, as well as means for determining that at least one grant is for D2D communications.

The grant determination module 510 may be configured to determine the various information included in the grant(s) descrambled by the descrambling module 505. For example, the grant determination module 510 may determine the SA resource(s) from the descrambled grant(s) and then determine the data resource(s) based at least in part on the determined SA resource(s). When a first grant is received for the SA resource(s) and a second grant is received for the data resource(s), the grant determination module 510 may determine the type of grant received based on an indicator that differentiates between the two transmissions. Alternatively, the grant determination module 510 may determine the type of grant received in accordance with a time period at which the first grant is transmitted and a different time period at which the second grant is transmitted. Alternatively, the grant determination module 510 may determine the type of grant received by reinterpreting a DCI flag to indicate which type of grant has been received. For example, when DCI format 0 is used by a base station to transmit the first and second grants, the DCI0 flag for format 0 may indicate an SA resource grant and the DCI0 flag for format 1A may indicate a data resource grant. The indications of the flag may be signaled to the UE 115-*d* via an RRC message, for example, to allow the UE 115-*d* to interpret the flag. The grant determination module 510, either alone or in combination with the D2D management module 310-*b*, may be means for identifying resources for D2D communications, means for analyzing an indicator, and/or means for determining other information for D2D communications.

Figure 6:
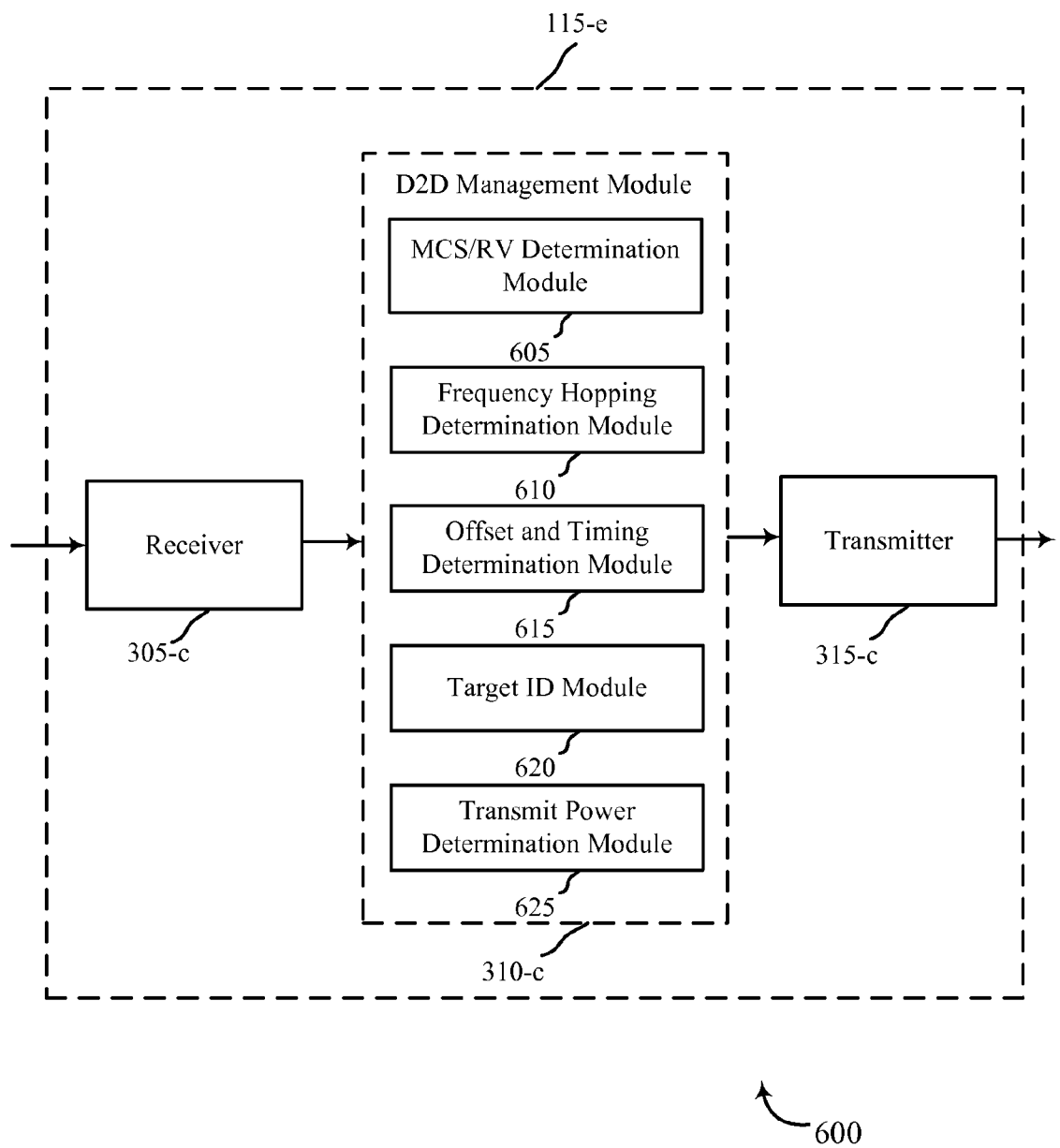
FIG. 6 shows a block diagram of a device for use in D2D communications, in accordance with various aspects of the present disclosure.

FIG. 6 shows a block diagram 600 of a UE 115-*e* for transmitting and/or receiving SA and data transmissions in accordance with various aspects of the present disclosure. The UE 115-*e* may be an example of one or more aspects of a UE 115 described with reference to FIGS. 1, 3, 4, and/or 5. The UE 115-*e* may include a receiver 305-*c*, a D2D management module 310-*c*, and/or a transmitter 315-*c*. The UE 115-*e* may also include a processor. Each of these components may be in communication with each other. The D2D management module 310-*c* may also include a MCS/RV determination module 605, a frequency hopping determination module 610, an offset and timing determination module 615, a target ID module 620, and a transmit power determination module 625.

The components of the UE 115-*e* may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The receiver 305-c may receive information which may be passed on to the D2D management module 310-c, and to other components of the UE 115-e as described above with reference to FIGS. 3, 4, and/or 5. The D2D management module 310-c may be configured to perform the operations described above with reference to FIGS. 3, 4, and/or 5. The transmitter 315-c may transmit one or more signals received from other components of the UE 115-e. For example, in cases where UE 115-e is a D2D transmitting device, it may transmit SA and data transmissions using D2D communications to one or more receiving UEs.

The MCS/RV determination module 605 may be configured to determine an MCS and/or RV for transmission of the SA and/or data in accordance with the grant(s). The frequency hopping determination module 610 may be configured to determine SA retransmission frequency hopping patterns in accordance with the grant(s), in a similar manner as discussed above with respect to FIG. 2, for example. The offset and timing determination module 615 may be configured to determine SA transmission, SA retransmission, and data transmission timing in accordance with the grant(s), in a similar manner as discussed above with respect to FIG. 2, for example. The target ID module 620 may be configured to determine a target ID, compress the target ID if needed, and scramble data transmissions based on the target ID in accordance with the grant(s), in a similar manner as discussed above with respect to FIG. 2, for example. The target ID module 620 may also be configured to decode scrambled data transmissions received at the UE 115-e based on information received in an SA. The transmit power determination module 625 may be configured to determine an SA transmit power and/or a data transmit power for D2D communications in accordance with the grant(s), such as based on the TPC bit(s) as discussed above. The foregoing modules 605-625, either alone or in combination with the D2D management module 310-c, may be means for determining the respective types of information from the grant(s) received from a base station 105 of FIG. 1.

Figure 7:
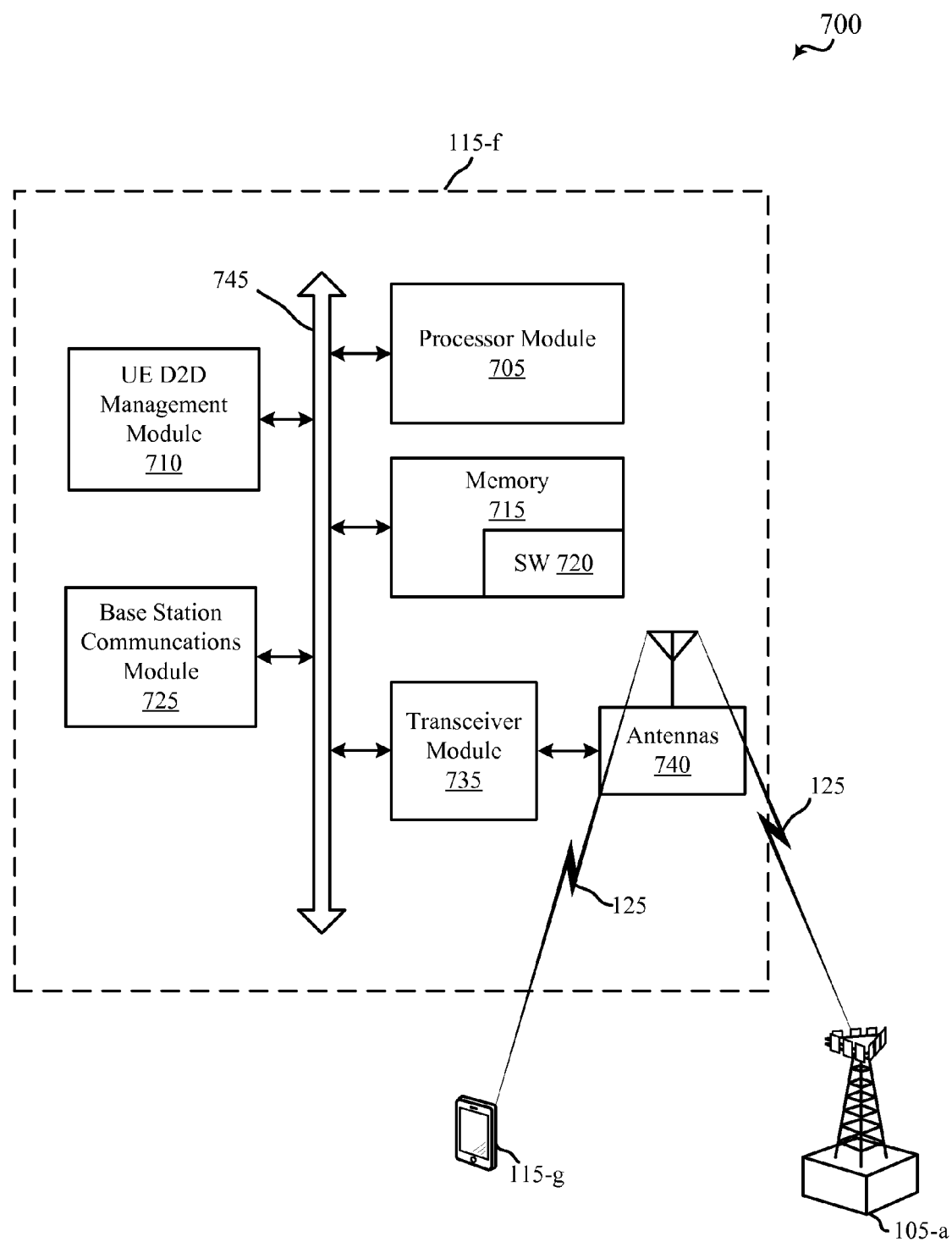
FIG. 7 shows a block diagram of a UE in a system for implementing D2D communications, in accordance with various aspects of the present disclosure.

FIG. 7 shows a block diagram of a system 700 configured for use in D2D communications, in accordance with various aspects of the present disclosure. System 700 may include a UE 115-f, which may be an example of a UE 115 with reference to FIGS. 1, 3, 4, 5, and/or 6. The UE 115-f may generally include components for bi-directional voice and data communications including components for transmitting communications and components for receiving communications.

The UE 115-f may include antenna(s) 740, a transceiver module 735, a processor module 705, and memory 715 (including software (SW) 720), which each may communicate, directly or indirectly, with each other (e.g., via one or more buses 745). The transceiver module 735 may be configured to communicate bi-directionally, via the antenna(s) 740 and/or one or more wired or wireless links, with one or more networks, as described above. For example, the transceiver module 735 may be configured to communicate bi-directionally with a base station 105-a. The transceiver module 735 may include a modem configured to modulate packets and provide the modulated packets to the antenna(s) 740 for transmission, and to demodulate packets received from the antenna(s) 740. While the UE 115-f may include a single antenna 740, the UE 115-f may also have multiple antennas 740 capable of concurrently transmitting and/or receiving multiple wireless transmissions. The transceiver module 735 may also be capable of concurrently communicating with one or more base stations 105. The base station communications module 725 may perform operations related to such communications with one or more base stations.

The memory 715 may include random access memory (RAM) and read-only memory (ROM). The memory 715 may store computer-readable, computer-executable software/firmware code 720 containing instructions that are configured to, when executed, cause the processor module 705 to perform various functions described herein (e.g., call processing, database management, processing of carrier mode indicators, module management, etc.). Alternatively, the software/firmware code 720 may not be directly executable by the processor module 705 but be configured to cause a computer (e.g., when compiled and executed) to perform functions described herein. The processor module 705 may include an intelligent hardware device, e.g., a central processing unit (CPU), a microcontroller, an ASIC, etc.

The UE 115-f may also include a UE D2D management module 710. The UE D2D management module 710 may be configured to determine SAs, determine one or more data transmissions and perform operations related to SA and data transmissions as discussed above with respect to FIG. 2. If UE 115-f is a D2D transmitting device, for example, the SA(s) may be determined for receiving UEs 115-g, and resources from an SA resource pool may be determined for transmission of the SA(s). Furthermore, the UE D2D management module 710 may determine a retransmission pattern for retransmissions of the SA(s), which may include one or both of a timing pattern and frequency hopping pattern for SA retransmissions. If UE 115-f is a D2D receiving device, the UE D2D management module 710 may monitor SA resources and determine if an SA transmission and/or retransmission are received. Based on the resources from the SA resource pool used for the SA transmissions(s), the UE D2D management module 710 may determine an SA retransmission pattern and resources that are to be used for data transmissions, which may include one or both of a timing pattern and frequency hopping pattern. Further, the UE D2D management module 710 may be configured to perform operations related to the grant(s) received from the base station 105-a, for example. Thus, the UE D2D management module 710 may be configured to perform operations to carry out the various functions described above with respect to FIGS. 3, 4, 5, and/or 6.

Figure 8:
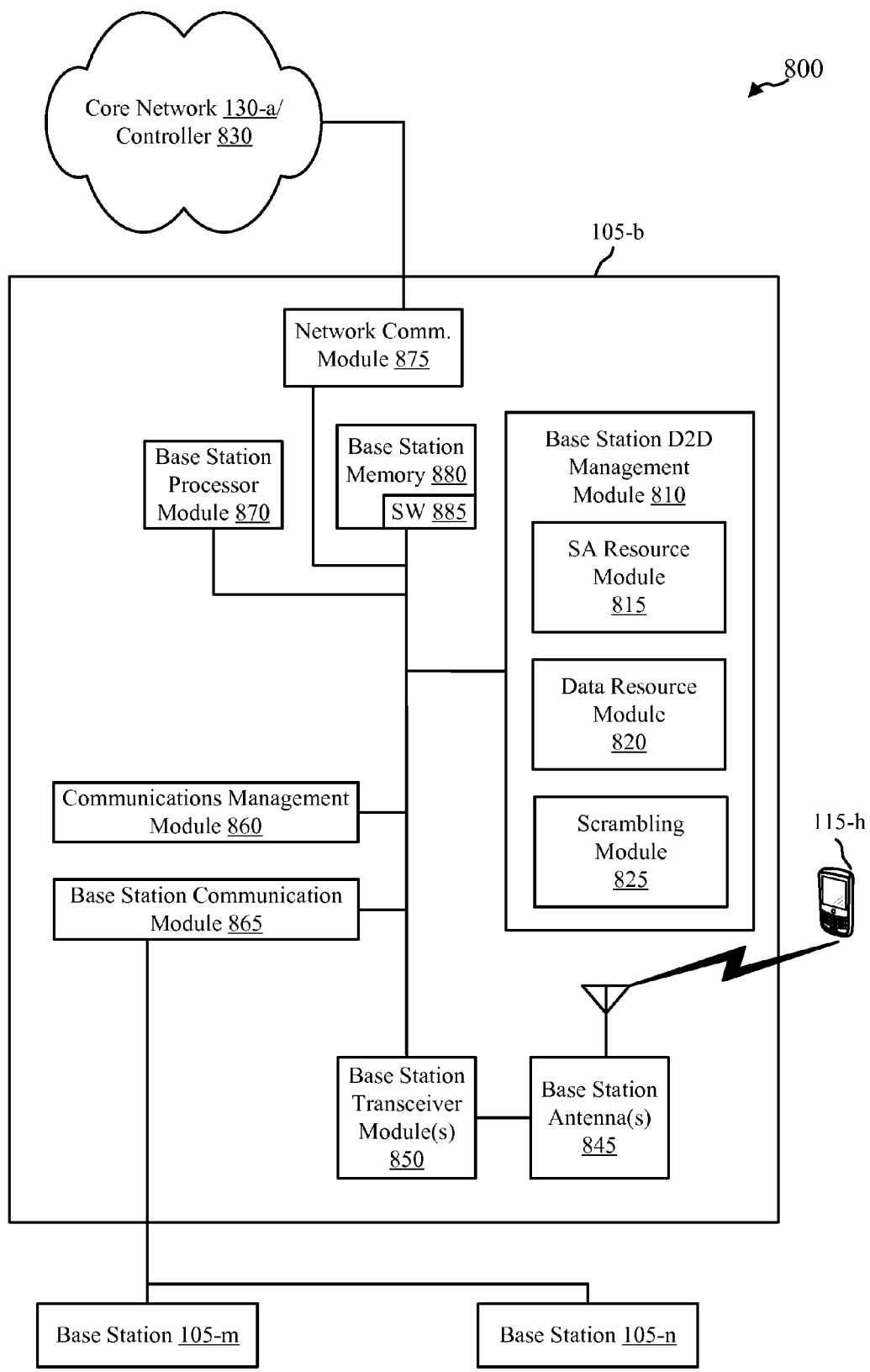
FIG. 8 shows a block diagram of a base station in a system for implementing D2D communications, in accordance with various aspects of the present disclosure.

FIG. 8 shows a block diagram of a communications system 800 that may be configured for use in receiving and transmitting D2D communications, including the transmission of grants, in accordance with various aspects of the present disclosure. The system 800 may be an example of aspects of the systems 100 and/or 700 described in FIGS. 1 and/or 7, respectively. System 800 may include a base station 105-b. The base station 105-b may include base station antenna(s) 845, a base station transceiver module 850, base station memory 880, and a base station processor module 870, which each may be in communication, directly or indirectly, with each other (e.g., over one or more buses). The base station transceiver module 850 may be configured to communicate bi-directionally, via the base station antenna(s) 845, with a UE 115-h, which may be an example of a UE 115 of FIGS. 1, 3, 4, 5, 6, and/or 7. The base station transceiver module 850 (and/or other components of the base station 105-b) may also be configured to communicate bi-directionally with one or more networks. In some cases, the base station 105-b may communicate with the core network 130-*a* and/or controller 830 through network communications module 875. Base station 105-*b* may be an example of the base stations 105 of FIG. 1. Controller 830 may be integrated into base station 105-*b* in some cases, such as with an eNodeB base station.

Base station 105-*b* may also communicate with other base stations 105, such as base station 105-*m* and base station 105-*n*. Each of the base stations 105 may communicate with the UE 115-*h* using different wireless communications technologies, such as different radio access technologies. In some cases, base station 105-*b* may communicate with other base stations such as 105-*m* and/or 105-*n* utilizing base station communication module 865. In some examples, base station communication module 865 may provide an X2 interface within an LTE wireless communication technology to provide communication between some of the base stations 105. In some examples, base station 105-*b* may communicate with other base stations through controller 830 and/or core network 130-*a*.

The base station memory 880 may include RAM and ROM. The base station memory 880 may also store computer-readable, computer-executable software code 885 containing instructions that are configured to, when executed, cause the base station processor module 870 to perform various functions described herein (e.g., receiving and transmitting D2D communications, and providing resource grants, timing information, and other information for D2D communications). Alternatively, the software code 885 may not be directly executable by the base station processor module 870 but be configured to cause the computer, e.g., when compiled and executed, to perform functions described herein. The base station processor module 870 may include an intelligent hardware device, e.g., a CPU, a microcontroller, an ASIC, etc.

The base station transceiver module 850 may include a modem configured to modulate packets and provide the modulated packets to the base station antenna(s) 845 for transmission, and to demodulate packets received from the base station antenna(s) 845. While some examples of the base station 105-*b* may include a single base station antenna 845, the base station 105-*b* may include multiple base station antennas 845 for multiple links which may support carrier aggregation. For example, one or more links may be used to support macro communications with the UE 115-*h*.

According to the architecture of FIG. 8, the base station 105-*b* may further include a communications management module 860. The communications management module 860 may manage communications with other base stations 105. As an example, the communications management module 860 may facilitate the transmittal of a D2D information, such as grants to D2D transmitting devices, etc., as discussed above. By way of example, the communications management module 860 may be a component of the base station 105-*b* in communication with some or all of the other components of the base station 105-*b* via a bus. Alternatively, functionality of the communications management module 860 may be implemented as a component of the base station transceiver module 850, as a computer program product, and/or as one or more controller elements of the base station processor module 870.

The components for base station 105-*b* may be configured to implement aspects discussed above with respect to FIGS. 2, 3, 4, 5, 6, and/or 7, which are not be repeated here for the sake of brevity. For example, the base station 105-*b* may include a base station D2D management module 810. Base station D2D management module 810 may include a D2D SA resource module 815, a D2D data resource module 820, and a scrambling module 825, each of which may be configured to perform or control some or all of the base station related features or functions described with reference to FIGS. 1, 2, 3, 4, 5, 6, and/or 7. The base station D2D management module 810, or portions of it, may include a processor, or some or all of the functions of the base station D2D management module 810 may be performed by the base station processor module 870 or in connection with the base station processor module 870. Additionally, the base station D2D management module 810, or portions of it, may include a memory, or some or all of the functions of the base station D2D management module 810 may use the base station memory 880 or be used in connection with the base station memory 880. Further, the base station D2D management module 810 may operate in conjunction with or under control of the communications management module 860 to facilitate the transmittal of a D2D information, such as grants to D2D transmitting devices, etc., as discussed above.

FIG. 9 shows a flowchart illustrating a method 900 for wireless communications, such as D2D communications, in accordance with various aspects of the present disclosure. The functions of method 900 may be implemented by a system device, such as a base station 105 or its components as described with reference to FIGS. 1, 3, 4, 6, 7, and/or 8. In some examples, a system device, such as one of the base stations 105, may execute one or more sets of codes to control the functional elements of the device to perform the functions described below.

At block 905, at least one grant is transmitted to one or more devices, such as one or more of the UEs 115. The at least one grant may identify one or more SA resources on which an SA is to be transmitted by the device for D2D communications, and may identify one or more data resources on which data is to be transmitted by the device for D2D communications. For example, the at least one grant may be transmitted via a PDCCH or a PDSCH, or a combination thereof. The at least one grant may be included in a DCI, for example, using DCI format 0. The operation(s) at block 905 may be performed using the base station D2D management module 810 and base station transceiver module 850 described with reference to FIG. 8.

It should be noted that the method 900 is just one implementation and that the operations of the method may be rearranged or otherwise modified such that other implementations are possible.

Figure 10:
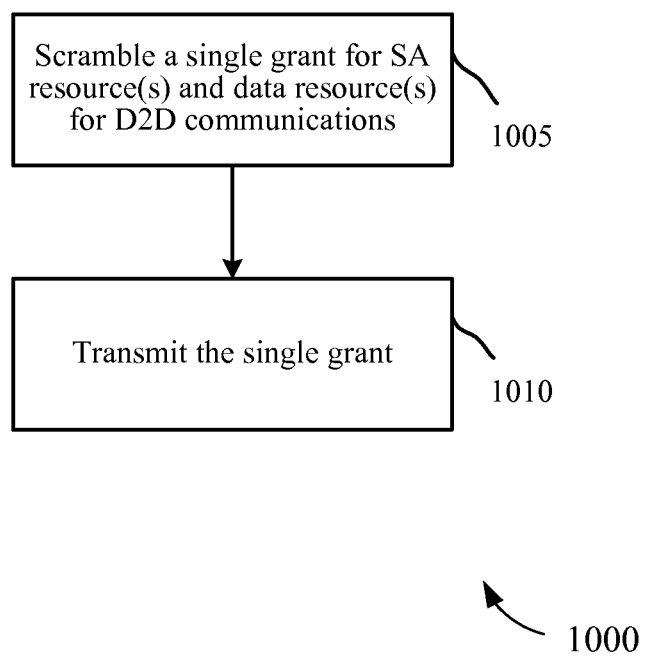
FIG. 10 shows a flowchart illustrating a method for wireless communications, in accordance with various aspects of the present disclosure.

FIG. 10 shows a flowchart illustrating another method 1000 for wireless communications, such as D2D communications, in accordance with various aspects of the present disclosure. The functions of method 1000 may be implemented by a system device, such as a base station 105 or its components as described with reference to FIGS. 1, 3, 4, 6, 7, and/or 8. In some examples, a system device, such as one of the base stations 105, may execute one or more sets of codes to control the functional elements of the device to perform the functions described below.

At block 1005, a single grant is scrambled. The single grant may be scrambled according to a scrambling type, such as discussed above, so that an intended UE 115 may descramble the single grant and identify the grant as being for D2D communications. The single grant may identify one or more SA resources, and may identify one or more data resources. As discussed above, the data resource(s) may be implicitly identified by the single grant based on the identified SA resource(s), for example. At block 1010, the single grant is transmitted to one or more devices, e.g., UEs 115. The operation(s) at block 1005 may be performed using the scrambling module 825 described with reference to FIG. 8, and the operations(s) at block 1010 may be performed using the transmitter 315 and the base station transceiver module 850 described with reference to FIG. 8.

It should be noted that the method 1000 is just one implementation and that the operations of the method, and the steps may be rearranged or otherwise modified such that other implementations are possible.

Figure 11:
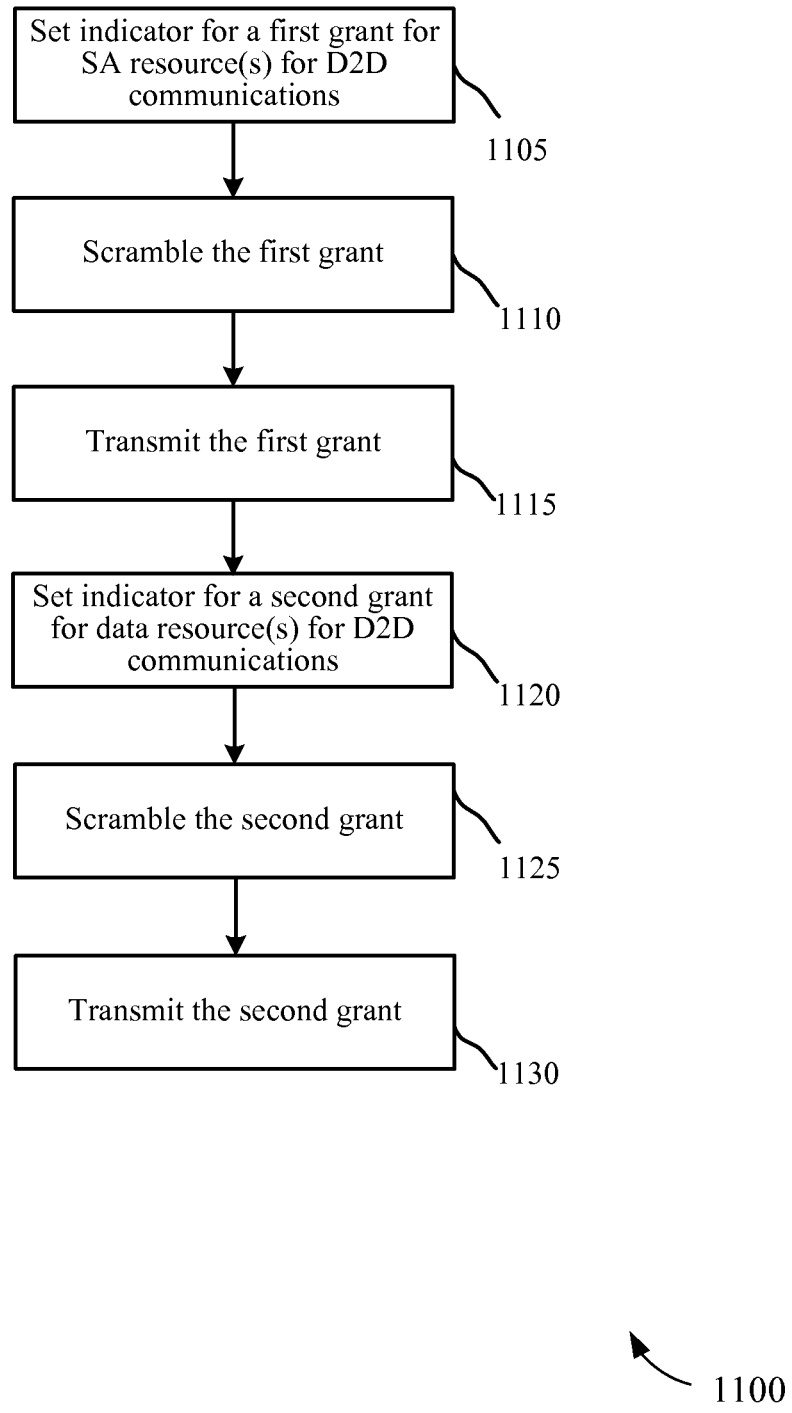
FIG. 11 shows a flowchart illustrating a method for wireless communications, in accordance with various aspects of the present disclosure.

FIG. 11 shows a flowchart illustrating another method 1100 for wireless communications, such as D2D communications, in accordance with various aspects of the present disclosure. The functions of method 1100 may be implemented by a system device, such as a base station 105 or its components as described with reference to FIGS. 1, 3, 4, 6, 7, and/or 8. In some examples, a system device, such as one of the base stations 105, may execute one or more sets of codes to control the functional elements of the device to perform the functions described below.

At block 1105, an indicator for a first grant may be set. The indicator may indicate that the first grant is a grant of one or more SA resources for D2D communications. Next, at block 1110, the first grant may be scrambled. Then, at block 1115, the first grant may be transmitted to one or more devices, e.g., UEs 115. The operation(s) at block 1105 may be performed using the SA resource module 815 described with reference with FIG. 8, the operation(s) at block 1110 may be performed using the scrambling module 825 described with reference to FIG. 8, and the operations(s) at block 1115 may be performed using the base station transceiver module 850 described with reference to FIG. 8.

At block 1120, an indicator for a second grant, different from the indicator set for the first grant, may be set. The indicator may indicate that the second grant is a grant of one or more data resources for D2D communications. Next, at block 1125, the second grant may be scrambled. Then, at block 1130, the second grant may be transmitted to one or more devices, e.g., UEs 115. As described above, the second grant may be transmitted at a time period different from the time period at which the first grant is transmitted. Further, the second grant may be transmitted at a time period that is based at least in part on the time period at which the first grant is transmitted. This may allow the receiving UE 115 to identify that the second grant is related to the first grant, and associate the first and second grants so as to use the SA resource(s) and the data resource(s) for D2D communications. The operation(s) at block 1120 may be performed using the SA resource module 815 described with reference with FIG. 8, the operation(s) at block 1125 may be performed using the scrambling module 825 described with reference to FIG. 8, and the operations(s) at block 1130 may be performed using the base station transceiver module 850 described with reference to FIG. 8.

It should be noted that the method 1100 is just one implementation and that the operations of the method, and the steps may be rearranged or otherwise modified such that other implementations are possible.

Figure 12:
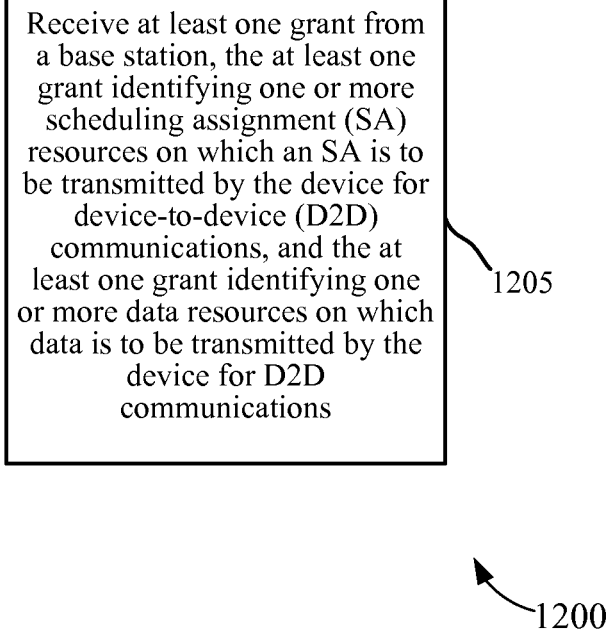
FIG. 12 shows a flowchart illustrating a method for wireless communications, in accordance with various aspects of the present disclosure.

FIG. 12 shows a flowchart illustrating a method 1200 for wireless communications, such as D2D communications, in accordance with various aspects of the present disclosure. The functions of method 1200 may be implemented by a device, such as a UE 115 or its components as described with reference to FIGS. 1, 3, 4, 6, 7, and/or 8. In some examples, a device, such as one of the UEs 115, may execute one or more sets of codes to control the functional elements of the device to perform the functions described below.

At block 1205, at least one grant is received from a base station 105. The at least one grant may identify one or more SA resources on which an SA is to be transmitted by the device for D2D communications, and may identify one or more data resources on which data is to be transmitted by the device for D2D communications. For example, the at least one grant may be received via a PDCCH or a PDSCH, or a combination thereof. The at least one grant may be included in DCI, for example, using DCI format 0. The operation(s) at block 1205 may be performed using the receiver 305 described with reference to FIGS. 3, 4, 5, and/or 5.

It should be noted that the method 1200 is just one implementation and that the operations of the method may be rearranged or otherwise modified such that other implementations are possible.

Figure 13:
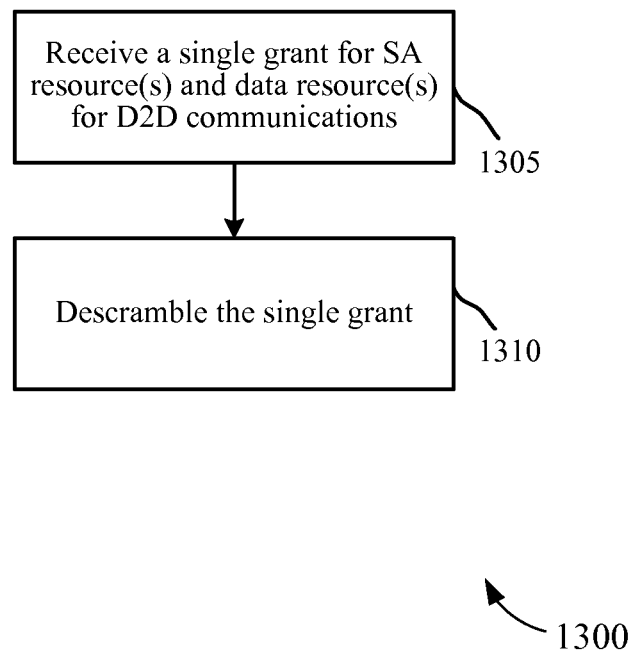
FIG. 13 shows a flowchart illustrating a method for wireless communications, in accordance with various aspects of the present disclosure.

FIG. 13 shows a flowchart illustrating another method 1300 for wireless communications, such as D2D communications, in accordance with various aspects of the present disclosure. The functions of method 1300 may be implemented by a device, such as a UE 115 or its components as described with reference to FIGS. 1, 3, 4, 6, 7, and/or 8. In some examples, a device, such as one of the UEs 115, may execute one or more sets of codes to control the functional elements of the device to perform the functions described below.

At block 1305, a single grant is received. The single grant may be scrambled according to a scrambling type, such as discussed above with reference to FIG. 5. If the single grant is intended for the UE 115, the UE 115 may descramble the single grant at block 1310. The single grant may identify one or more SA resources, and may identify one or more data resources. As discussed above, the data resource(s) may be implicitly identified by the single grant based on the identified SA resource(s), for example. The operation(s) at block 1305 may be performed using the receiver 305 described with reference to FIGS. 3, 4, 5, and/or 5, and the operation(s) at block 1310 may be performed using the descrambling module 505 described with reference to FIG. 5.

It should be noted that the method 1300 is just one implementation and that the operations of the method, and the steps may be rearranged or otherwise modified such that other implementations are possible.

Figure 14:
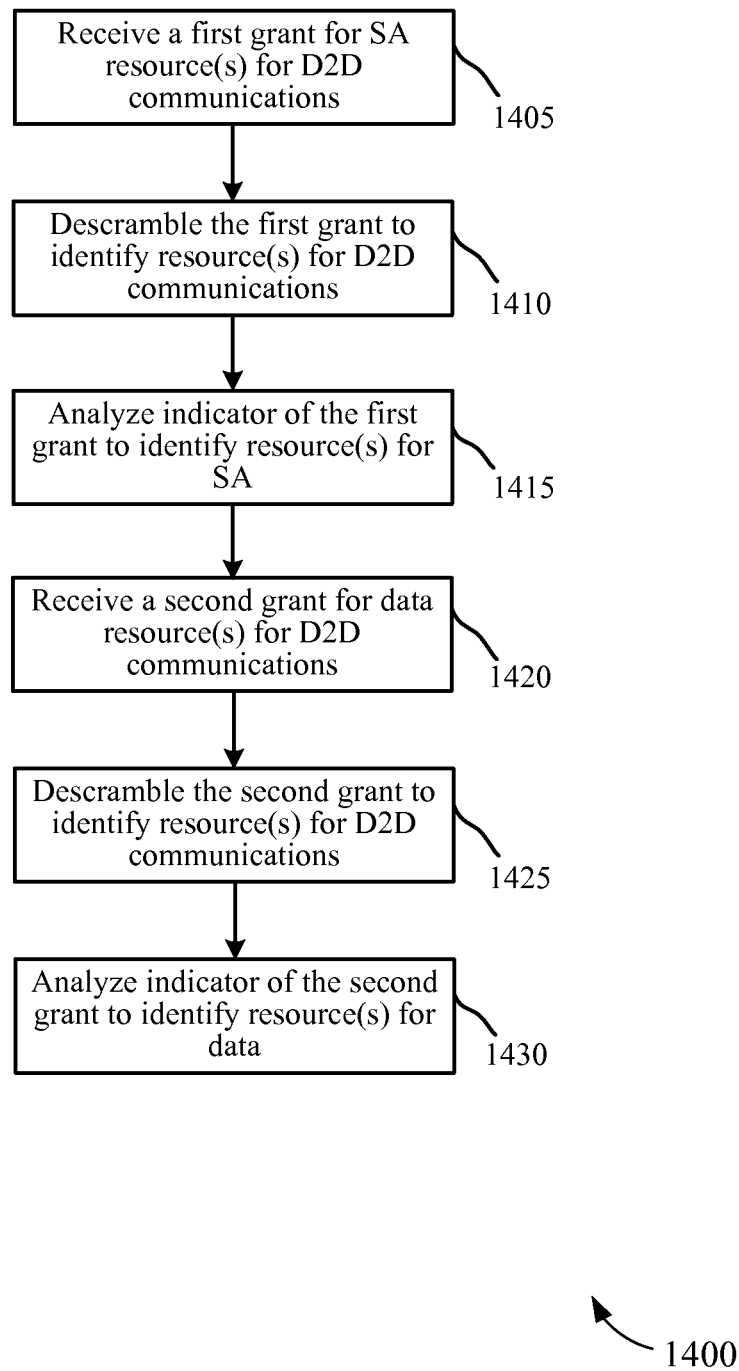
FIG. 14 shows a flowchart illustrating a method for wireless communications, in accordance with various aspects of the present disclosure.

FIG. 14 shows a flowchart illustrating another method 1400 for wireless communications, such as D2D communications, in accordance with various aspects of the present disclosure. The functions of method 1400 may be implemented by a device, such as a UE 115 or its components as described with reference to FIGS. 1, 3, 4, 6, 7, and/or 8. In some examples, a device, such as one of the UEs 115, may execute one or more sets of codes to control the functional elements of the device to perform the functions described below.

At block 1405, a first grant may be received for SA resource(s) for D2D communications. If the first grant is intended for the UE 115, the UE 115 may descramble the first grant at block 1410. The operation(s) at block 1405 may be performed using the receiver 305 described with reference to FIGS. 3, 4, 5, and/or 5, and the operation(s) at block 1410 may be performed using descrambling module 505 described with reference to FIG. 5. The UE 115 may then analyze an indicator included with the first grant to determine whether the first grant is a grant of one or more SA resources or a grant of one or more data resources for D2D communications at block 1415, in this example being for SA resource(s). The operation(s) at block 1415 may be performed using the grant determination module 510 described with reference to FIG. 5.

At block 1420, a second grant may be received for data resource(s) for D2D. If the second grant is intended for the UE 115, the UE 115 may descramble the second grant at block 1425. The operation(s) at block 1420 may be performed using the receiver 305 described with reference to FIGS. 3, 4, 5, and/or 5, and the operation(s) at block 1425 may be performed using descrambling module 505 described with reference to FIG. 5. The UE 115 may then analyze an indicator included with the second grant to determine whether the second grant is a grant of one or more SA resources or a grant of one or more data resources for D2D communications at block 1430, in this example being for data resource(s). As described above, the first and second grants may be identified as being related based on the time period at which the first and second grants were transmitted. The operation(s) at block 1430 may be performed using the grant determination module 510 described with reference to FIG. 5.

It should be noted that the method 1400 is just one implementation and that the operations of the method, and the steps may be rearranged or otherwise modified such that other implementations are possible.

The detailed description set forth above in connection with the appended drawings describes examples and does not represent the only examples that may be implemented or that are within the scope of the claims. The term "example" and "exemplary," when used in this description mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

As used herein, the terms "device" and "apparatus" are interchangeable.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communications, comprising:
transmitting at least one grant to a first device, the at least one grant identifying one or more scheduling assignment (SA) resources on which an SA is to be transmitted by the first device for a device-to-device (D2D) communication between the first device and a second device, and the at least one grant identifying one or more data resources on which data is to be transmitted by the first device for the D2D communication between the first device and the second device, wherein the SA schedules the data transmission on the one or more data resources identified by the at least one grant for the D2D communication.

2. The method of claim 1, further comprising:
scrambling the at least one grant according to a scrambling type, the scrambling type indicating that the one or more SA resources and the one or more data resources are allocated for the D2D communication.

3. The method of claim 2, wherein the scrambling type comprises a D2D radio network temporary identifier (RNTI).

4. The method of claim 2, wherein the scrambling type comprises a semi-persistent scheduling (SPS) D2D radio network temporary identifier (RNTI).

5. The method of claim 2, wherein the scrambling comprises scrambling a cyclic redundancy check (CRC) of the at least one grant.

6. The method of claim 1, wherein the at least one grant comprises a single grant.

7. The method of claim 6, wherein the single grant identifies the one or more SA resources for the first device to use to transmit the SA, the one or more data resources being identified by the first device based at least in part on the one or more SA resources.

8. The method of claim 1, wherein the at least one grant comprises a first grant and a second grant, the first grant identifying the one or more SA resources, and the second grant identifying the one or more data resources.

9. The method of claim 8, wherein the transmitting comprises:
transmitting the first grant identifying the one or more SA resources at a first time period; and
transmitting the second grant identifying the one or more data resources at a second time period, the second time period being different from the first time period, and the second time period being determined based at least in part on the first time period.

10. The method of claim 9, further comprising:
setting an indicator to differentiate between the transmission of the first grant identifying the one or more SA resources and the transmission of the second grant identifying the one or more data resources.

11. The method of claim 1, wherein the at least one grant comprises an SA transmit power, an SA modulation and coding scheme (MCS), an SA redundancy version, or a combination thereof.

12. The method of claim 1, wherein the at least one grant comprises a data transmit power, a data modulation and coding scheme (MCS), a data redundancy version, or a combination thereof.

13. The method of claim 1, wherein the at least one grant comprises a target identification (ID) for a destination device of the SA, wherein the target ID is a groupcast ID, a broadcast ID, or a unicast ID, and wherein the target ID is compressed or index-based.

14. The method of claim 1, wherein the at least one grant comprises a time hopping pattern of the one or more data resources, a frequency hopping pattern of the one or more data resources, or a combination thereof.

15. The method of claim 1, wherein the at least one grant includes one or more transmit power control (TPC) bits, the TPC bits indicating an SA transmit power or a data transmit power.

16. The method of claim 1, wherein the at least one grant is transmitted via a physical downlink control channel (PDCCH) or a physical downlink shared channel (PDSCH), or a combination thereof, in Long Term Evolution (LTE).

17. The method of claim 16, wherein the at least one grant is included in downlink control information (DCI).

18. The method of claim 16, wherein the PDSCH includes information regarding both the one or more SA resources and the one or more data resources for D2D communications.

19. The method of claim 16, further comprising:
scrambling the at least one grant transmitted via the PDCCH with a D2D radio network temporary identifier (RNTI) to indicate that the at least one grant is related to the D2D communication.

20. The method of claim 16, further comprising:
scrambling the at least one grant transmitted via the PDCCH with a target identifier (ID).

21. An apparatus for wireless communications, comprising:
means for transmitting at least one grant to a first device, the at least one grant comprising a first grant identifying one or more scheduling assignment (SA) resources on which an SA is to be transmitted by the first device for a device-to-device (D2D) communication between the first device and a second device, and the at least one grant identifying one or more data resources on which data is to be transmitted by the first device for the D2D communication between the first device and the second device, wherein the SA schedules the data transmission on the one or more data resources identified by the at least one grant for the D2D communication.

22. The apparatus of claim 21, further comprising:
means for scrambling the at least one grant according to a scrambling type, the scrambling type indicating that the one or more SA resources and the one or more data resources are allocated for the D2D communication.

23. The apparatus of claim 22, wherein the scrambling type comprises a D2D radio network temporary identifier (RNTI).

24. The apparatus of claim 22, wherein the scrambling type comprises a semi-persistent scheduling (SPS) D2D radio network temporary identifier (RNTI).

25. The apparatus of claim 22, wherein the means for scrambling is configured to scramble a cyclic redundancy check (CRC) of the at least one grant.

26. The apparatus of claim 21, wherein the at least one grant comprises a single grant.

27. The apparatus of claim 26, wherein the single grant identifies the one or more SA resources for the first device to use to transmit the SA, the one or more data resources being identified by the first device based at least in part on the one or more SA resources.

28. The apparatus of claim 21, wherein the at least one grant comprises a first grant and a second grant, the first grant identifying the one or more SA resources, and the second grant identifying the one or more data resources.

29. The apparatus of claim 28, wherein the means for transmitting is configured to:
transmit the first grant identifying the one or more SA resources at a first time period; and
transmit the second grant identifying the one or more data resources at a second time period, the second time period being different from the first time period, and the second time period being determined based at least in part on the first time period.

30. The apparatus of claim 29, further comprising:
means for setting an indicator to differentiate between the transmission of the first grant identifying the one or more SA resources and the transmission of the second grant identifying the one or more data resources.

31. A device for use in a wireless communications system, comprising:
a processor;
memory in electronic communication with the processor; and
instructions being stored in the memory, the instructions being executable by the processor to:

transmit at least one grant to a first device, the at least one grant comprising a first grant identifying one or more scheduling assignment (SA) resources on which an SA is to be transmitted by the first device for a device-to-device (D2D) communication between the first device and a second device, and the at least one grant identifying one or more data resources on which data is to be transmitted by the first device for the D2D communication between the first device and the second device, wherein the SA schedules the data transmission on the one or more data resources identified by the at least one grant for the D2D communication.

32. The device of claim 31, wherein the instructions are executable by the processor to:
scramble the at least one grant according to a scrambling type, the scrambling type indicating that the one or more SA resources and the one or more data resources are allocated for the D2D communication.

33. The device of claim 32, wherein the scrambling type comprises a D2D radio network temporary identifier (RNTI).

34. The device of claim 32, wherein the scrambling type comprises a semi-persistent scheduling (SPS) D2D radio network temporary identifier (RNTI).

35. The device of claim 32, wherein the instructions are executable by the processor to:
scramble a cyclic redundancy check (CRC) of the at least one grant.

36. The device of claim 31, wherein the at least one grant comprises a single grant.

37. The device of claim 36, wherein the single grant identifies the one or more SA resources for the first device to use to transmit the SA, the one or more data resources being identified by the first device based at least in part on the one or more SA resources.

38. The device of claim 31, wherein the at least one grant comprises a first grant and a second grant, the first grant identifying the one or more SA resources, and the second grant identifying the one or more data resources.

39. The device of claim 38, wherein the instructions are executable by the processor to:
transmit the first grant identifying the one or more SA resources at a first time period; and
transmit the second grant identifying the one or more data resources at a second time period, the second time period being different from the first time period, and the second time period being determined based at least in part on the first time period.

40. The device of claim 39, wherein the instructions are executable by the processor to:
set an indicator to differentiate between the transmission of the first grant identifying the one or more SA resources and the transmission of the second grant identifying the one or more data resources.

41. A non-transitory computer-readable medium storing code for communications at a wireless device, the code comprising instructions executable to:
transmit at least one grant to a first device, the at least one grant identifying one or more scheduling assignment (SA) resources on which an SA is to be transmitted by the first device for a device-to-device (D2D) communication between the first device and a second device, and the at least one grant identifying one or more data resources on which data is to be transmitted by the first device for the D2D communication between the first device and the second device, wherein the SA schedules the data transmission on the one or more data resources identified by the at least one grant for the D2D communication.

42. The non-transitory computer-readable medium of claim 41, wherein the instructions are executable to:
scramble the at least one grant according to a scrambling type, the scrambling type indicating that the one or more SA resources and the one or more data resources are allocated for the D2D communication.

43. The non-transitory computer-readable medium of claim 42, wherein the scrambling type comprises a D2D radio network temporary identifier (RNTI).

44. The non-transitory computer-readable medium of claim 42, wherein the scrambling type comprises a semi-persistent scheduling (SPS) D2D radio network temporary identifier (RNTI).

45. The non-transitory computer-readable medium of claim 42, wherein the instructions are executable to:
scramble a cyclic redundancy check (CRC) of the at least one grant.

46. The non-transitory computer-readable medium of claim 41, wherein the at least one grant comprises a single grant.

47. The non-transitory computer-readable medium of claim 46, wherein the single grant identifies the one or more SA resources for the first device to use to transmit the SA, the one or more data resources being identified by the first device based at least in part on the one or more SA resources.

48. The non-transitory computer-readable medium of claim 41, wherein the at least one grant comprises a first grant and a second grant, the first grant identifying the one or more SA resources, and the second grant identifying the one or more data resources.

49. The non-transitory computer-readable medium of claim 48, wherein the instructions are executable to:
transmit the first grant identifying the one or more SA resources at a first time period; and
transmit the second grant identifying the one or more data resources at a second time period, the second time period being different from the first time period, and the second time period being determined based at least in part on the first time period.

50. The non-transitory computer-readable medium of claim 49, wherein the instructions are executable to:
set an indicator to differentiate between the transmission of the first grant identifying the one or more SA resources and the transmission of the second grant identifying the one or more data resources.

51. A method of wireless communications, comprising:
receiving, at a first device, at least one grant from a base station, the at least one grant identifying one or more scheduling assignment (SA) resources on which an SA is to be transmitted from the first device to a second device for a device-to-device (D2D) communication between the first device and the second device and the at least one grant identifying one or more data resources on which data is to be transmitted for the D2D communication between the first device and the second device; and
transmitting, by the first device to the second device, the SA on the one or more SA resources identified by the at least one grant, wherein the SA schedules the data transmission on the one or more data resources identified by the at least one grant for the D2D communication.

52. The method of claim 51, wherein the at least one grant is scrambled, the method further comprising:

descrambling the at least one grant according to a descrambling technique.

53. The method of claim 52, further comprising:
determining that the one or more SA resources and the one or more data resources are allocated for the D2D communication based at least in part on the descrambling technique.

54. The method of claim 52, further comprising:
determining that the one or more SA resources and the one or more data resources are semi-persistently allocated for the D2D communication based at least in part on the descrambling technique.

55. The method of claim 52, wherein the descrambling comprises descrambling a cyclic redundancy check (CRC) of the at least one grant.

56. The method of claim 51, wherein the at least one grant comprises a single grant.

57. The method of claim 56, further comprising:
identifying, from the single grant, the one or more SA resources to use to transmit the SA; and
identifying the one or more data resources to use to transmit the data, the identification of the one or more data resources based at least in part on the one or more SA resources.

58. The method of claim 51, wherein the at least one grant comprises a first grant and a second grant, the first grant identifying the one or more SA resources, and the second grant identifying the one or more data resources.

59. The method of claim 58, wherein the receiving comprises:
receiving the first grant identifying the one or more SA resources at a first time period; and
receiving the second grant identifying the one or more data resources at a second time period, the second time period being different from the first time period, and the second time period being determined based at least in part on the first time period.

60. The method of claim 59, further comprising:
analyzing an indicator to differentiate between the transmission of the first grant identifying the one or more SA resources and the transmission of the second grant identifying the one or more data resources.

61. The method of claim 51, wherein the at least one grant is received via a physical downlink control channel (PDCCH) or a physical downlink shared channel (PDSCH), or a combination thereof, in Long Term Evolution (LTE).

62. The method of claim 61, wherein the PDSCH includes information regarding both the one or more SA resources and the one or more data resources for the D2D communication.

63. The method of claim 61, further comprising:
descrambling the at least one grant transmitted via the PDCCH with a D2D radio network temporary identifier (RNTI) to indicate that the at least one grant is related to the D2D communication.

64. The method of claim 61, further comprising:
descrambling the at least one grant transmitted via the PDCCH with a target identifier (ID).

65. The method of claim 61, wherein the at least one grant is included in downlink control information (DCI).

66. An apparatus for wireless communications, comprising:
means for receiving, at a first device, at least one grant from a base station, the at least one grant comprising a first grant identifying one or more scheduling assignment (SA) resources on which an SA is to be transmitted from the first device to a second device for a device-to-device (D2D) communication between the first device and the second device, and the at least one grant identifying one or more data resources on which data is to be transmitted for the D2D communication between the first device and the second device; and
means for transmitting, by the first device to the second device, the SA on the one or more SA resources identified by the at least one grant, wherein the SA schedules the data transmission on the one or more data resources identified by the at least one grant for the D2D communication.

67. A first device for wireless communications, comprising:
a processor;
memory in electronic communication with the processor; and
instructions being stored in the memory, the instructions being executable by the processor to:
receive, at the first device, at least one grant from a base station, the at least one grant identifying one or more scheduling assignment (SA) resources on which an SA is to be transmitted from the first device to a second device for a device-to-device (D2D) communication between the first device and the second device, and the at least one grant identifying one or more data resources on which data is to be transmitted for the D2D communication between the first device and the second device; and
transmit, by the first device to the second device, the SA on the one or more SA resources identified by the at least one grant, wherein the SA schedules the data transmission on the one or more data resources identified by the at least one grant for the D2D communication.

68. A non-transitory computer-readable medium storing code for communications at a first device, the code comprising instructions executable to:
receive, at the first device, at least one grant from a base station, the at least one grant identifying one or more scheduling assignment (SA) resources on which an SA is to be transmitted from the first device to a second device for a device-to-device (D2D) communication between the first device and the second device, and the at least one grant identifying one or more data resources on which data is to be transmitted for the D2D communication between the first device and the second device; and
transmit, by the first device to the second device, the SA on the one or more SA resources identified by the at least one grant, wherein the SA schedules the data transmission on the one or more data resources identified by the at least one grant for the D2D communication.

* * * * *